United States Patent [19]

Vogt et al.

[11] 4,216,107
[45] Aug. 5, 1980

[54] ORGANIC TITANIUM COMPOUNDS AS VISCOSITY IMPROVERS FOR POLYOL COMPOUNDS

[75] Inventors: Herwart C. Vogt, Grosse Ile; Bernardas Brizgys, Southgate; Moses Cenker, Trenton; John T. Patton, Jr., Wyandotte, all of Mich.

[73] Assignee: BASF Wyandotte Corporation, Wyandotte, Mich.

[21] Appl. No.: 904,861

[22] Filed: May 11, 1978

Related U.S. Application Data

[63] Continuation-in-part of Ser. No. 756,097, Jan. 3, 1977, abandoned.

[51] Int. Cl.$^2$ .......................... C08K 5/56; C07F 7/28; C08K 5/06; C08K 5/10
[52] U.S. Cl. ............................ 252/182; 260/45.75 R; 260/429.5; 560/89; 560/198
[58] Field of Search ................. 252/182; 260/45.75 F, 260/429.5; 560/89, 198

[56] References Cited

U.S. PATENT DOCUMENTS

| | | | |
|---|---|---|---|
| 3,951,886 | 4/1976 | Miyake et al. | 560/89 |
| 4,081,494 | 3/1978 | Sakai et al. | 260/45.75 F |

OTHER PUBLICATIONS

Modern Plastics Enc., 53 No. 10 A, 10/1976, pp. 161, 166.
Ken-React & Update Supplement No. 2, pp. 1-51 (1976).

Primary Examiner—Benjamin R. Padgett
Assistant Examiner—Irwin Gluck
Attorney, Agent, or Firm—Andrew E. Pierce; Norbert M. Lisicki

[57] ABSTRACT

The addition of small amounts of organic titanium compounds to polyol compounds reduces the viscosity of said compounds.

14 Claims, No Drawings

ORGANIC TITANIUM COMPOUNDS AS VISCOSITY IMPROVERS FOR POLYOL COMPOUNDS

CROSS-REFERENCE TO RELATED APPLICATION

This is a continuation in part of application Ser. No. 756,097, filed Jan. 3, 1977, now abandoned.

BACKGROUND OF THE INVENTION

1. Field of the Invention

Polyglycol compounds such as polyoxyalkylene ether polyols, polyester polyols and polytetramethylene glycols hereinafter for convenience called polyols are commonly used in the production of urethane polymers. These polyols are reacted with polyisocyanates in the presence of catalysts and other materials to produce urethane polymers which may be in the form of elastomers, sealants, caulking compounds, coatings, flexible or rigid foams and the like. These polyols in and of themselves, depending on the nature of the starting material and the molecular weight employed, may have extremely high viscosities. Additionally in the preparation of certain types of urethane polymers the polyols may have added to them inorganic fillers or pigments which contribute to the high viscosities of the system. In order that these polyols may be used for the preparation of urethanes, it is desirable to reduce the viscosities to such a level that handling of the solutions is made easier.

2. Prior Art

The prior art teaches that organic titanate compounds may be effective viscosity reducing agents when added to polymeric systems employing inorganic fillers. There is no teaching however that these titanate compounds may effectively reduce the viscosity of the polyglycol compounds themselves.

SUMMARY OF THE INVENTION

It has been discovered that the addition of small amounts of certain organic titanium compounds to polyols drastically reduces the formulation viscosity which permits for rapid leveling and easier processing of these polyols upon reaction with polyisocyanates or even prior to reaction with polyisocyanates.

DESCRIPTION OF THE PREFERRED EMBODIMENTS

The process for reducing the viscosity of polyester and polyether polyols involves the addition of an effective amount of an organic titanium compound to said polyols. The organic titanium compounds which may be employed in the practice of this invention can be broadly postulated as being based on tetravalent titanium and have the following structure:

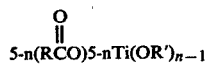

wherein R' is a radical individually selected from the group consisting of an aliphatic radical having from 1 to 18 carbon atoms, an alicyclic radical having between 1 and 3 rings, 5 or 6 carbon atoms per ring, and between 5 and 18 carbon atoms per molecule, and an aromatic radical having between 1 and 3 rings and between 6 and 18 carbon atoms per molecule, R is an aliphatic radical having from 1 to 17 carbon atoms, and n is an integer of 1-5. It has been found that very small amounts of an organic titanium compound cause a pronounced decrease in polyol viscosity and as little as 0.1 percent has been found to reduce the viscosity by as much as 30 percent. Higher concentrations of titanium compound have still a further appreciable influence but the values do tend to plateau. It is contemplated that the amount of organic titanium compound which is added to the polyol can range from 0.01 percent to about 20 weight percent of the amount of polyol. The addition of these organic titanium compounds has no appreciable influence on the curing rate of the polyols when reacted with polyisocyanates. As a matter of fact it appears that the addition of organic titanium compounds in the presence of a catalyst such as phenylmercuric acetate has a synergistic effect in reducing the viscosity of the polyol formulation. Thus the present invention concerns the addition of the amount of the organic titanium compound ranging from 0.01 to about 20 weight percent based on the polyol concentration to reduce the viscosity of said polyol whether or not the polyol contains within it additional inorganic fillers or pigments.

The polyols employed in accordance with the present invention include those polyols prepared by condensing monomeric units such as ethylene oxide, propylene oxide, the isomeric butylene oxides, styrene oxide and mixtures thereof with active hydrogen compounds such as ethylene glycol, propylene glycol, water, dipropylene glycol, diethylene glycol, 1,2-butanediol, 1,3-butanediol, 1,4-butanediol, hexanetriol, glycerol, trimethylolpropane, trimethylolethane, hydroquinone, pentaerythritol, α-methylglucoside, sorbitol, sucrose, ethylene diamine, diethylene triamine, toluenediamine, aniline, methylene aniline, piperazine, triisopropanolamine, and bisphenol A, wherein these polyols have molecular weights ranging from about 100 to about 26,000.

Included are those polyols which are characterized as being essentially hydroxyl terminated polyether polyols which have the general formula

wherein R is an alkylene radical and n is an integer which in a preferred embodiment is sufficiently large that the compound as a whole has a molecular weight from about 100 to about 26,000. These would include polyoxyethylene glycol, polyoxypropylene glycol, polyoxybutylene glycol and polytetramethylene glycol. Other typical polyols include block copolymers, for example, combinations of polyoxypropylene and polyoxyethylene glycols, more specifically, those having the general formula

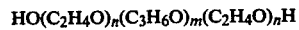

wherein n and m are together sufficient for attainment of the desired minimum molecular weight, that is about 100. Also included are block copolymers of poly-1,2- and 2,3-oxybutylene and polyoxyethylene glycols and poly-1,4-oxybutylene and polyoxypropylene glycols and random copolymers, glycols prepared from blends of two or more alkylene oxides as well as glycols as described above capped with the ethylene oxide units. The polyols employed in accordance with this invention can contain arylene or cycloalkylene radicals together with the alkylene radicals as for example in the condensation products of a polyoxyalkylene ether glycol with α,α'-dibromo-p-xylene in the presence of a catalyst. In such products, the cyclic groups inserted in a polyether chain are preferably phenylene, naphthalene, or cyclohexylene radicals or those radicals containing alkyl or alkylene substituents as in the tolylene, phenylethylene or xylylene radicals. Also included are the polyols prepared by the reaction of hydroxy compounds with acids or anhydrides to form hydroxy terminated esters. Representative polycarboxylic acids and anhydrides which may be employed include oxalic, malonic, succinic, glutaric, adipic, pimelic, suberic, azelaic, sebacic, brassylic, thapsic, maleic, fumaric, glutaconic, α-hydromuconic, β-hydromuconic, α-butyl-α-ethyl-glutaric, α-β-diethylsuccinic, isophthalic, terephthalic, hemimellitic, and 1,4-cyclohexanedicarboxylic. Any suitable polyhydric alcohol including both aliphatic and aromatic may be used such as ethylene glycol, diethylene glycol, dipropylene glycol, triethylene glycol, tetraethylene glycol, trimethylene glycol, 1,2-propylene glycol, 1,4-tetramethylene glycol, 1,2-butylene glycol, 1,3-butane diol, 1,4-butane diol, 1,3-pentane diol, 1,6-hexane diol, 1,7-heptane diol, glycerol, 1,1,1-trimethylolpropane, 1,1,1-trimethylolethane, hexane-1,2,6-triol, neopentyl glycol, dibromoneopentyl glycol, 1,10-decanediol, and 2,2-bis(4-hydroxycyclohexyl) propane.

The fillers of inorganic pigments which are sometimes employed as additives to the polyols are conventional materials and are generally inert. Typical examples of fillers which may be employed in polyol compositions include attapulgite, kaolin, talc, bentonite, haloysite, aluminum silicate, calcium silicate, magnesium trisilicate, zinc oxide, barium sulfate, titanium dioxide, calcium carbonate, iron oxide and the like. Mixtures of these and other fillers may be used also.

The amount of filler employed can be varied over broad ranges and certainly depends upon the particular properties and characteristics which are desired in the final product. Generally the filler can be added in amounts of between 10 to 150 percent by weight of the polyol component.

Examples of suitable organic polyisocyanates include such aliphatic diisocyanates as hexamethylene diisocyanate, cyclohexyl-2,4-isocyanate, 4,4-methylene bis cyclohexyl isocyanate. Included in the aromatic polyisocyanates are 2,4-toluene diisocyanate, 2,6-toluene diisocyanate, mixtures of 2,4 and 2,6-toluene diisocyanate, 4,4'-methylene bis phenylisocyanate, 1,5-naphthalene diisocyanate, 4,4',4"-triphenylmethane triisocyanate, and polyalkylene polyaryl polyisocyanate.

The organotitanium compounds which can be employed in the practice of this invention include tetramethyl titanate, tetraethyl titanate, tetraallyl titanate, tetrapropyl titanate, tetraisopropyl titanate, tetrabutyl titanate, tetracyclopentyl titanate, tetrahexyl titanate, tetracyclohexyl titanate, tetrabenzyl titanate, tetraoctyl titanate, tetraethylhexyl titanate, tetranonyl titanate, tetradecyl titanate, and tetraoleyl titanate.

Mixed alkyl titanate compounds would include trimethylbutyl titanate, dimethyldibutyl titanate, triethylbutyl titanate, propyl tributyl titanate, ethyl tricyclohexyl titanate, diisopropyl dioctadecyl titanate, dibutyl dioctadecyl titanate, and isopropyl triisostearoyl titanate.

Included among the aromatic titanates are methyl triphenyl titanate, tetraphenyl titanate, o- and m-tetramethylphenyl titanate, and 1- and 2-tetranaphthyl titanate.

The following examples are provided to further illustrate the invention. In these Examples the polyols and additives designated by letters A, B, etc., are as follows:

Polyol A is a sorbitol propylene oxide adduct of about 600 molecular weight.

Additive B is tetrabutyl titanate.

Polyester polyol C is a polyester of adipic acid and diethylene glycol of about 2900 molecular weight.

Polyol D is an adduct of glycerol, tetrachlorophthalic anhydride, propylene oxide having a molecular weight of about 600.

Additive E is isopropyl triisostearoyl titanate.

Polyol F is an adduct or glycerol, allyl glycidyl ether and propylene oxide having a molecular weight of about 6500, capped with 15% by weight ethylene oxide, then treated with 20% by weight acrylonitrile.

Polyol G is an ethylene diamine-propylene oxideethylene oxide adduct having a molecular weight of about 500 and containing about 10% ethylene oxide.

Polyol H is an adduct of trimethylolpropane, propylene oxide, ethylene oxide having a molecular weight of about 25,000 containing about 19% propylene oxide.

EXAMPLE 1

The runs depicted below in Table I were made by adding the designated quantities of Additive B to 272 grams of Polyol A in a lined container and dispersing the mixture with a Cowles Dissolver at 2500 rpm for 60 seconds. The samples were degassed at 1 to 10 mm mercury pressure at ambient temperatures to remove any trapped air. The viscosities were determined at 80° F. using a Brookfield RVF viscosimeter using a No. 7 spindle at the 2.5 rpm. These results indicate the polyol viscosity reductions achieved by the increased additions of Additive B.

Table I

| Run | 1 | 2 | 3 | 4 | 5 |
|---|---|---|---|---|---|
| % Additive B | — | 0.1 | 1.5 | 5.0 | 10.0 |
| Viscosity, cps. | 912,000 | 656,000 | 456,000 | 240,000 | 68,800 |

EXAMPLE 2

The procedure of Example 1 was employed in this Example. The effect of Additive E on the viscosity of Polyester polyol C is shown in Table II below.

Table II

| Run | 1 | 2 |
|---|---|---|
| % Additive E | — | 1.0 |
| Viscosity, cps | 13,500 | 11,900 |

EXAMPLE 3

Employing the procedure of Example 1, a viscosity reduction of Polyol D was achieved employing Additive E as shown in Table III below.

Table III

| Run | 1 | 2 |
|---|---|---|
| % Additive E | — | 1.0 |
| Viscosity, cps | 840,000 | 312,000 |

EXAMPLE 4

The effect of Additive E on the viscosity of Polyol F was determined using the procedure of Example 1. A substantial reduction in viscosity was achieved as shown in Table IV below.

Table IV

| Run | 1 | 2 |
|---|---|---|
| % Additive E | — | 1.0 |
| Viscosity, cps | 16,240 | 11,900 |

EXAMPLE 5

Additive B was added to Polyol G and the viscosities were determined using the procedure of Example 1. The reduced viscosity is shown in Table V below.

Table V

| Run | 1 | 2 |
|---|---|---|
| % Additive B | — | 1.0 |
| Viscosity, cps | 3696 | 3280 |

EXAMPLE 6

Additive E was added to Polyol H and the viscosities were determined using the procedure of Example 1. The reduction of viscosity is shown in Table VI below.

Table VI

| Run | 1 | 2 |
|---|---|---|
| % Additive E | — | 1.0 |
| Viscosity, cps | 77,200 | 68,800 |

EXAMPLE 7

A mixture of 272 grams of Polyol A was mixed with 128 grams of calcined aluminum silicate, 0.8 grams of phenyl mercuric acetate and 24.4 grams of toluene diisocyanate and 1% by weight Additive B based on the weight of polyol using a Cowles Dissolver at 2500 rpm for 60 seconds. After degassing, the viscosity was measured using a Brookfield RVF viscosimeter at two minute intervals for 25 minutes at 78° F. An identical mixture without the titanate compound was prepared in the same manner and the viscosity was determined at two minute intervals for 25 minutes at 78° F. A plot of the viscosities versus time revealed that both samples increased in viscosity at the same rate indicating that the titanate compound did not appreciably influence the cure rate.

The embodiments of the invention in which an exclusive property or privilege is claimed are defined as follows:

1. A process for reducing the viscosity of an unfilled polyol composition consisting essentially of polyester or polyether polyols and mixtures thereof by the addition of an effective amount of an organic titanate having the formula

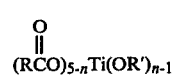

wherein R is an aliphatic radical having from 1 to 17 carbon atoms, R' is a radical selected from the group consisting of an aliphatic radical having from 1 to 18 carbon atoms, an alicyclic radical having between 1 and 3 rings, 5 or 6 carbon atoms per ring, and between 5 and 18 carbon atoms per molecule, and an aromatic radical having between 1 and 3 rings and between 6 and 18 carbon atoms per molecule, and n is an integer of 1–5.

2. The process of claim 1 wherein the organic titanate is tetraisopropyl titanate.

3. The process of claim 1 wherein the organic titanate is tetrabutyl titanate.

4. The process of claim 1 wherein the organic titanate is isopropyl triisostearoyl titanate.

5. The process of claim 1 wherein the amount of organic titanate is from 0.01 to 20 weight percent of the polyol.

6. The process of claim 1 wherein the amount of organic titanate is from 0.1 to 10 weight percent of the polyol.

7. The process of claim 1 wherein the amount of organic titanate is from 0.5 to 5 weight percent of the polyol.

8. The unfilled polyol composition consisting essentially of polyester or polyether polyols and mixtures thereof in combination with an effective amount of an organic titanate having the formula

wherein R is an aliphatic radical having from 1 to 17 carbon atoms, R' is a radical selected from the group consisting of an aliphatic radical having from 1 to 18 carbon atoms, an alicyclic radical having between 1 and 3 rings, 5 or 6 carbon atoms per ring, and between 5 and 18 carbon atoms per molecule, and an aromatic radical having between 1 and 3 rings and between 6 and 18 carbon atoms per molecule, and n is an integer of 1–5.

9. The composition of claim 8 wherein the organic titanate is tetraisopropyl titanate.

10. The composition of claim 8 wherein the organic titanate is tetrabutyl titanate.

11. The composition of claim 8 wherein the organic titanate is isopropyl triisostearoyl titanate.

12. The composition of claim 8 wherein the amount of organic titanate is from 0.01 to 20 weight percent of the polyol.

13. The composition of claim 3 wherein the amount of organic titanate is from 0.1 to 10 weight percent of the polyol.

14. The composition of claim 8 wherein the amount of organic titanate is from 0.5 to 5 weight percent of the polyol.

* * * * *